United States Patent Office 3,803,302
Patented Apr. 9, 1974

3,803,302
TREATMENT OF ANIMALS WITH A COPOLYMER
Norman A. Miner, Zionsville, and Turner Alfrey, Jr., Midland, Mich., assignors to The Dow Chemical Company, Midland, Mich.
No Drawing. Filed Dec. 2, 1968, Ser. No. 780,576
Int. Cl. A61k 27/00
U.S. Cl. 424—81         15 Claims

ABSTRACT OF THE DISCLOSURE

A method which comprises administering to animals an antiviral amount of a copolymer, and a copolymer useful in practicing the method. Such method and copolymer are useful in protecting the animals from the attack of various parasites and particularly from viruses, and to bring about the production of interferon or interferon-like materials.

BACKGROUND OF THE INVENTION

Animals such as reptiles, birds and mammals are subject to the attack of a wide variety of parasites including protozoan organisms and viruses. Such viruses can usually be classified upon the basis of the chemical constitution and structure of the virus particle. Thus, classes of viruses can be defined in terms of properties such as nucleic acid composition, size, sensitivity to extraction with lipid solvents such as ether, presence of an envelope, cubical or helical symmetry of the capsid, number of capsomeres and the like. Representative viruses include picornaviruses, reoviruses, arboviruses, myxoviruses, papovaviruses, adenoviruse, herpesviruses and poxviruses, as well as other viruses. Protozoan organisms can usually be classified upon the basis of morphological characteristics, reproductive cycle and life cycle, specificity as to animal host and the like. Representative protozoan organisms include Toxoplasma, Plasmodium, Coccidia, Trichomonas and Histomonas, for example.

Viruses are known to be inhibited by intracellular inhibitors such as interferon or interferon-like materials. Interferon is usually considered by the skilled artisans to be a protein of relatively low molecular weight and in the range of 20,000 to 30,000. However, various scientists have detected much larger interferons or viral inhibitors having molecular weights ranging up to 120,000 or 160,000. The inhibitors such as interferon, when administered to or produced in animals including living animals as well as living animal tissues such as tissue cultures, cell lines and the like, are taught to result in the inhibition of viral reproduction. More recently, interferon or interferon-like materials have been found to inhibit the attack of such protozoan organisms as *Toxoplasma gondii* as well as the causative agents of malaria. Viruses have been established to induce the production of inhibitors such as interferon in animals and such induced interferon has been found and isolated from various parts of the animal organism such as the hemopoietic system, the nervous system and the lungs. Further, the inhibitors generally appear to the skilled artisans to be substantially species specific and not viral specific so that rat interferon is virtually useless with rabbits or fowl and vice versa. Also, interferon as been produced in quantities for investigational use in tissue cultures such as leukocyte culture and amnionic culture. However, there is a need for a safe method which can be employed in the preparation of interferon or interferon-like materials in quantities sufficient for more than investigational use and for the safe, rapid and satisfactory induction of long lasting protecting of the animal organism from viral attack.

It is an object of the present invention to provide a method for the treatment of animals. It is a further object to provide a method which is useful for the inhibition of the attack of parasites and particularly viruses upon animals. An additional object is the provision of a method which results in the presence of significant quantities of interferon or interferon-like inhibitors in the animal organism. An additional object is the provision of a method which is useful to provide the animal or animal tissues such as tissue with cultures a resistance to the attack of parasitic organism and particularly virus organisms. A further object is to provide a method which can be employed to protect animals from viral attack for substantial periods such as from several weeks to several months. Another object is the provision of a method which can be practiced prophylactically to provide the animal with a continuous protection from the attack of virus organisms. Another object is the provision of a method which accomplishes these outstanding and desirable results without an adverse effect upon the animal.

SUMMARY OF THE INVENTION

The present invention is directed to the method which comprises treating animals with a parasiticidal or antiviral amount of a copolymer and to the compositions employed in the method. Such method and compositions are characterized by several outstanding and beneficial properties. Thus, they are useful to inhibit the attack of various agents and particularly viruses upon animals such as cold blooded animals including fish and reptiles; and warm-blooded animals including rodents such as mice, rats, rabbits and guinea pigs; marsupials; birds such as chickens, turkeys, ducks and the like; and larger mammals such as dogs, cats, monkeys, cattle, swine and sheep, for example, as well as living animal cells or tissues such as animal cell lines, embryo cell tissue cultures and the like. Also, they are useful to induce the production of interferon or an interferon-like inhibitor in the body of the animals. Further, they are useful to provide the animal with a resistance to the attack of virus organisms over a period of from several weeks to several months. Additionally, the method can be practiced prophylactically to provide the animal with a continuous resistance to such attack. Such outstanding and desirable results can be obtained in the practice of the present invention without adverse effect upon the animal organism.

The method of the invention comprises the administration to an animal of an antiviral amount of a copolymer. The copolymer employed in the method of the invention is a copolymer of an acrylic monomer with a dicarboxylic monomer which can be one or more of maleic acid, itaconic acid and citraconic acid. More particularly, the copolymer is the product of the polymerization of the acrylic monomer with one or more of the dicarboxylic monomers, citraconic, itaconic and maleic acid, the acrylic monomer comprising from about 10 to about 80, inclusive, percent by weight of the total monomeric components; that is, the monomers being employed in the proportions of from about 10 to about 80, inclusive, parts by weight of acrylic monomer and from about 90 to about 20, inclusive, parts by weight of the dicarboxylic monomer, the total amount of monomeric components being 100 parts by weight. The term "monomer ratio" as employed in the present specification and claims means and refers to the weight ratio of the monomers employed to produce a copolymer. The copolymer of the invention is further characterized in that the copolymer has a specific viscosity of from about 0.1 to about 8, inclusive. Specific viscosity is a dimensionless quantity which represents a definite physical property of individual copolymers and which is susceptible of rapid and accurate determination. Specific viscosity is a function of the identity of the monomeric constituents, the ratio of monomers and the molecular weight of the copolymer. Specific viscosity is thus a measurement of the relative molecular weights of copolymers with the same monomer ratio and the same monomeric constituents. When the identity of the monomers and the monomer ratio is the same in different copolymers, the copolymers having higher specific viscosity values have higher molecular weights. Individual copolymers can thus be readily and simply identified by the parameters of their monomeric composition, including the identity and relative amounts of monomers and their specific viscosity. Expressions such as "specific viscosity" or "specific viscosity of 1.4" as employed in the present specification and claims mean and refer to a specific viscosity as determined with an aqueous solution containing 0.5 gram of copolymer per 100 milliliters at a temperature of 25° C.

The acrylic monomer is acrylic acid or a mixture of acrylic acid and acrylamide, provided that the amount of free acrylic acid is at least equal to the amount of acrylamide and provided further that the weight of acrylamide is no more than 20 percent of the weight of total acrylic and dicarboxylic monomer. The term "acrylic monomer" as employed in the present specification and claims thus means and refers to a mixture of from about 10 to about 80, inclusive, percent by weight of acrylic acid and from zero to about 20, inclusive, percent by weight of acrylamide, the total amount of acrylic acid and acrylamide being equal to the number of parts by weight of acrylic monomer and the amount of acrylic acid in the acrylic monomer being equal to or greater than the amount of acrylamide. In general, however, the presence of acrylamide in the acrylic monomer does not improve the antiviral activity of the copolymer as compared to acrylic acid, and increased monomer ratios of acrylamide can reduce the antiviral qualities of the copolymers. It is thus preferred that the acrylic monomer be acrylic acid.

The copolymers of the invention can be employed in the form of the free copolymeric acids or in the form of pharmaceutically-acceptable salts thereof. The term "pharmaceutically-acceptable salt" as employed in the present specification and claims refers to those salts of the free acid copolymer with cationic moieties which are substantially nontoxic and nonirritating at dosages consistent with good antiviral activity. Representative pharmaceutically-acceptable salts of the copolymers which can be employed in the method of the invention include salts of a copolymer with one or more cations selected from alkali metal cations such as lithium, sodium or potassium; alkaline earth metal cations such as calcium or magnesium; ammonium; ferric or ferrous iron; mono-, di-, tri-, or tetraalkyl- or hydroxyalkylammonium wherein alkyl is of from 1, to 2, to 3 carbon atoms; physiologically-active cations which produce no substantially deleterious or toxic effects at dosages consistent with good antiviral activity such as pyridoxine, thiamine and the like and including amphoteric substances such as lysine, glycine, leucine and the like. Preferred pharmaceutically-acceptable salts of the copolymers are prepared by conventional procedures such as the reaction of a copolymer with a pharmaceutically-acceptable basic substance such as a carbonate, bicarbonate or hydroxide containing the corresponding cation. Such reaction can be described as a neutralization reaction. Since the copolymers have a plurality of carboxylic acid moieties, they can be wholly or partly neutralized by formation of a pharmaceutically-acceptable salt involving one or more cation with part or all the carboxylic acid moieties. Terms such as "neutralized" or "neutralized copolymer" as employed herein refer to the pharmaceutically-acceptable salts of the copolymer resulting from such neutralization.

In the present specification and claims, the terms "copolymer" and "a copolymer" are employed generically as inclusive of the free copolymeric acids as well as the pharmaceutically-acceptable salts thereof. For the sake of convenience, when it is desired to refer specifically to the pharmaceutically-acceptable salt form of a copolymer, terms such as "pharmaceutically-acceptable salt of a copolymer" or "neutralized copolymer" will be employed in the present specification and claims.

The copolymers are conveniently administered to animals by a parenteral route, that is, under or through one or more layers of skin or mucous membrane. In such preferred procedure, the parenteral administration of an antiviral amount of copolymer to an animal is carried out by any suitable technique to accomplish the introduction of an antiviral amount of copolymer into the animal body fluid systems such as the intracellular or extracellular fluid compartments, the lymphatic system or the blood circulatory system, for example. The copolymer is preferably administered by injection via any of various routes such as intraperitoneal, subcutaneous, intramuscular, or the like.

In the naming of particular copolymers herein, the names of the monomers employed, the ratio of monomers and the specific viscosity will be set out. The monomer ratio will be set out by an expansion such as "$A/I$ of 20:80" in which the monomeric acid is identified by a letter, acrylic acid by "A," citraconic acid by "C," maleic acid by "M" and itaconic acid by "I," and the numerals indicate the weight ratio of the corresponding monomeric acid. In the present specification and claims, when a portion of the acrylic monomer is amidated to form acrylamide, then acrylamide will be named separately from the free, unamidated acrylic acid, and the monomer ratio of acrylamide will be identified by the expression "$A-NH_2$." The terms "acrylic acid" and "A" as employed in the present specification and claims refer to the unamidated acrylic acid. In the case of individual pharmaceutically-acceptable salts, the cationic moiety is conveniently identified by setting out the material employed to neutralize the acid copolymer together with the pH resulting from such neutralization.

As employed in the present specification and claims, and particularly as employed herein in reference to the monomer ratio of copolymers and the specific viscosity of the copolymers, expressions such as "from 10 to 80" mean from 10, to 20, to 25, to 30, to 40, to 48, to 50, to 60 and so on up to 80 and include all the intermediate individual values and intermediate ranges of values contained within the broader range such as from 10 to 11, from 13 to 29, from 17 to 32, from 45 to 65 and so on; while expressions such as "from 0.1 to 8" similarly mean from 0.1, to 0.2, to 0.3, to 0.4, to 0.5, to 0.6, to 0.7, to 0.8, to 0.9, to 1.0, to 1.5, to 2, to 2.5, to 3, to 3.5, to 4, to 4.5, to 5, to 5.5, to 6, to 6.5, to 7, to 7.5, to 8 and include all the intermediate values and ranges contained therein such as 0.13, 0.76, 1.44, 3.12, 2.8, 4.6, 5.3, 6.11, 7.2, 7.6, 7.9, 8 and from 0.7 to 3.5, from 1.13 to 2.58, from 0.3 to 3.0 from 4 to 8, from 2.31 to 7.65, from 3.9 to 6.2, from 1.44 to 4.21, from 5.5 to 7.8, and so on. The expressions such as "monomer ratio of 80:20" as employed in the specification and claims means and refer to the copolymer product of the polymerization of two monomers, the monomers being employed in the amount of 80 parts by weight of a first-mentioned monomer and 20 parts by weight of a second-mentioned monomer. For example, the expressions "monomer ratio ($A/I$) or 40:60" and "monomer ratio acrylic:itaconic 40:60" mean and refer to the copolymer product of the polymerization of 40 parts by weight of acrylic acid and 60 parts by weight of itaconic acid, while expressions such as "monomer ratio A/I/C of 30:30:40" mean and refer to the copolymer product of the polymerization of 30 parts by weight of acrylic acid, 30 parts by weight of itaconic acid and 40 parts by weight of citraconic acid and so on. The expressions such as "monomer ratio of from 80:20 to 10:90" or "monomer ratio between 80:20 and 10:90" mean and refer to copolymer products of the polymerization of the polymerization of 100 parts by weight of total monomer comprising from 80 to 10 parts by weight of a first monomer and from 20 to 90 parts by weight of a second monomer. Thus, the expressions such as "monomer ratio A/I of from 80:20 to 10:90" refer to copolymers of the polymerizaton of the named monomers, the ratio of monomers being from 80:20, to 70:30, to 65:35, to 57:43, to 50:50, to 40:60, to 33:67, to 25:75, to 10:90 as well as to all the intermediate ratios and intermediate ranges of ratios included therein.

Preferred copolymers are those wherein the acrylic monomer is acrylic acid. The copolymers having a specific viscosity between about 0.5 and 4 are further preferred. In general, itaconic acid and maleic acid are the preferred dicarboxylic monomers. The copolymers wherein the dicarboxylic monomer comprises itaconic acid have excellent antiviral properties and freedom from side effects and toxic properties over a wide range of specific viscosities, thus providing a high degree of flexibility in selection of copolymers as compared to copolymers in which the dicarboxylic monomer does not include itaconic acid. Itaconic acid is thus a particularly preferred dicarboxylic monomer. Another preferred group of copolymers includes copolymers of acrylic and itaconic acids with a monomer ratio $(A/I)$ of from about 10:90 to about 60:40 and copolymers of acrylic and maleic acid with a monomer ratio $(A/M)$ of from about 20:80 to about 60:40. Particularly preferred copolymers for use in the method and compositions of the invention are a copolymer of acrylic acid and itaconic acid with a monomer ratio $(A/I)$ between about 40:60 and about 60:40 and a specific viscosity between about 0.5 and about 8 and a copolymer of acrylic and maleic acid with a monomer ratio $(A/M)$ between about 40:60 and about 60:40 and a specific viscosity between about 0.5 and about 2.5, such copolymers having very potent antiviral properties and desirable ratios of toxic dose to antiviral dose, in many cases being many times more potent and/or much less toxic than other copolymers of the invention. Other preferred copolymers include the various terpolymers of acrylic acid with two or more of citraconic acid, maleic acid and itaconic acid wherein the monomer ratio of acrylic acid to the total of the dicarboxylic acid monomers is from 20:80 to 60:40.

The copolymers employed in the method and composition of the invention conveniently are prepared by the copolymerization of the named monomers. The polymerization proceeds readily when the monomers are mixed together generally in aqueous polymerization media, and typically in the presence of a polymerization catalyst such as potassium persulfate and, optionally, a chain transfer agent such as thioglycolic acid, thioethanol or cystine or an optional catalyst activator such as sodium bisulfite. It is generally preferable to employ the monomeric acid as acrylic acid and one or more of itaconic acid, maleic acid or citraconic acid, although pharmaceutically-acceptable salts of one or more of the monomeric acids can also be employed to obtain the copolymer product in the form of a pharmaceutically-acceptable salt. The polymerization can also be carried out in an inert organic liquid polymerization medium, employing a suitable catalyst such as benzoyl peroxide or azo bis(isobutyronitrile), however, the preferred polymerization media are aqueous media. The preferred aqueous media can include pharmaceutically-acceptable electrolytes, such as sodium sulfate, sodium bisulfate, sodium chloride or the like. The exact copolymer is dependent on a variety of factors such as the identity of the monomers, the ratio of monomers, the polymerization time and temperature and the type and amount of chain transfer agent employed. Polymerization techniques to be employed can utilize modifications of known methods or procedures analogous to known techniques, such as, for example, the procedures of Askarov et al., Academy of Sciences of the Uzbek S.S.R. Uzbek Chemical Journal, 1, 38–39 (1968) and Tate, Adv. Polymer Sci., vol. 5, pp. 214–'232 (1967). For any given mixture of monomer starting materials, increasing the concentration of chain transfer agent generally serves to produce a copolymeric product of lower specific viscosity. Chain transfer agents of moderate to high solubility in the polymerization mixture facilitate varying the chain transfer agent concentration and thus varying the specific viscosity, and such soluble agents are preferred. For example, in an aqueous polymerization mixture, thioglycolic acid is a preferred chain transfer agent, as compared to the relatively insoluble cystine. The polymerization proceeds when the mixture of monomers, aqueous solvent, catalyst and chain transfer agent is held at a temperature of from about 0° to aobut 20° to about 80° C. for from about 2 to 48 to 96 to 240 to 300 or more hours. Following the polymerization, the reaction mixture containing the cpolymer product can be dialyzed against deionized water for from about 2 to about 48 hours to separate impurities such as the catalyst and chain transfer agent, for example. The dialyzed or undialyzed copolymer products can be employed directly in the treatment of animals, or they can be further separated, purified or treated by various conventional procedures such as dialysis, electrodialysis, drying, neutralization, lyophilization, filtration, treatment with ion exchange resins, sterilization, fractionation by chromatographic techniques or by other techniques such as extraction or selective precipitation with organic solvents. It is generally desirable that the copolymer product be treated to remove impurities. In a convenient procedure, the copolymer product is dialyzed for from about 2 to about 48 hours. It is generally preferred that the copolymer product be treated to provide a concentration of impurities not substantially greater than that obtainable by dialysis against water for about two hours.

The administration of an antiviral amount of one or more copolymer to an animal is critical and essential to the practice of the method of the invention. The term "antiviral amount" is employed in the present specification and claims to designate that amount of a copolymer which is sufficient to induce the production of interferon or an interferon-like substance in the body of an animal, to inhibit the attack of viruses on the animal organism or to inhibit the attack of intracellular parasites such as Toxoplasma gondii. The administration to an animal of an antiviral amount of a copolymer is equivalent to the administration of a parasiticidal amount of the copolymer and, in general, interferon production or release, inhibition of viral attack and inhibition of attack by various intracellular parasites can be accomplished by administration of the same antiviral amount. Whether or not an antiviral amount of a copolymer is administered under particular circumstances can be ascertained by conventional testing procedures such as assay for interferon in the animal organism or by animal challenge procedures to determine inhibition of virus attack or parasite infection. The different testing procedures are known to vary in sensitivity depending upon such factors as assay procedure and materials employed; species, age and condition of animal challenged; severity and type of challenge; and the like. Therefore, when it is desired to determine whether a particular small amount of a copolymer is an antiviral amount, the more sensitive test procedures should be employed. Due to factors such as the relative ease and convenience of supply and maintenance of viruses for use in assay procedures as compared to protozoan parasites, and the existence of a variety of known procedures for evaluating the activity of interferon and interferon-like materials against viruses, and for evaluation of protection from viruses, it is generally convenient to employ test procedures which utilize a virus. Therefore, procedures utilizing viruses will be described herein as illustrative of the tests which can be employed to determine the antiviral amount of copolymer to be employed in particular cases.

Assay of interferon can be carried out by procedures such as those described by Finter, Interferons, pp. 87–118, Frontiers of Biology, vol. 2, North-Holland Publishing Company, Amsterdam (1966). In a convenient assay procedure, animal body fluid which is being assayed for interferon, such as serum, is diluted with a suitable medium and various dilutions are incubated in a tissue culture of suitable tissue cells. After an appropriate period, the tissue culture is challenged with a suitable virus strain. The tissue culture monolayer is then examined after a suitable incubation time for the number of plaques formed by the challenge virus. Substantial reduction of plaque numbers or protection of the tissue culture from virus attack when the cells are incubated with various dilutions of the animal body fluid indicates the presence of interferon, which can thus be quantitatively assayed. In an alternative procedure to determine whether an antiviral amount of a copolymer has been administered, the animal is challenged with a dose of a suitable virus and held for observation to determine whether or not viral attack is inhibited as compared with untreated animals which are similarly challenged. Inhibition of viral attack can be indicated in a variety of ways including (1) protection of animals from physical symptoms of viral attack; (2) survival of a lethal virus challenge; (3) inhibition of reproduction of the challenge virus in the animal, as determined by an assay for the virus; or (4) failure of the animal to produce antibodies in response to the virus challenge as determined by immunological assay procedures.

The antiviral amount of a copolymer to be administered to an animal can vary depending upon such factors as the particular monomers employed to prepare the copolymer, the ratio of monomers and the specific viscosity of the particular copolymer, the size, weight, age and species of animal treated, the time and route of administration, whether or not the copolymer is administered in a single dose or in multiple doses and the particular effects desired to be produced, that is, whether it is desired only to provide a desired concentration of interferon or interferon-like substances in the animal system, or whether it is desired to protect the animal against viral infection of light, moderate or severe degree over short periods of time or long periods of time. For example, an antiviral dose sufficient to protect the animal against a virus challenge at about 1 to 2 times the 50 percent infectious dose, ID50, for that virus can be substantially less than the amount of copolymer required to protect the same animal against a virus challenge 50 or 100 times as great. Similarly, the antiviral dose of a copolymer sufficient to protect an animal against a relatively mild virus challenge may be insufficient to demonstrate the presence of interferon by the conventional interferon assay techniques described above. In general, the copolymers can be administered at dosage rates of from about 0.05 to 150 or more milligrams of copolymer per kilogram of animal body weight. Preferably, the copolymers are administered by injection at dosages of from about 0.5 to about 15 milligrams of copolymer per kilogram of animal body weight. Single or multiple doses of copolymers administered at such dosage rates have been found to give excellent antiviral results as ascertained by methods such as interferon assay techniques or by challenge procedures and to sufficient to protect animals from viral attack for periods from several days to several weeks.

The antiviral amount of copolymer can be varied to provide particular effects in a given animal receiving a given virus challenge. For example, an animal can be administered an antiviral amount of copolymer sufficient to protect the animal from physical or pathological symptoms of virus attack but less than that antiviral amount of copolymer sufficient to inhibit the production of antibodies when the animal is exposed to a virus. Such as procedure, involving the step of administration to an animal of an antiviral amount of copolymer sufficient to protect the animal from pathological symptoms but less than that antiviral amount sufficient to prevent antibody production, together with the additional step of exposing the animal to a virus attack capable of eliciting antibody production, can thus be employed in immunization procedures. It is generally preferred to administer the copolymer to the animal and thereafter to bring about the virus exposure or challenge at a time when the animal is in a viral inhibiting state, conveniently from about 1 to 14 days after the administration of the copolymer. The exact antiviral amount to be administered depends on such factors as time of administration and exposure, animal treated, the type and severity of the virus exposure and the particular copolymer composition employed. The exact procedure to be employed in a given situation can be ascertained by conventional procedures such as routine range-finding operations.

The copolymers employed in the method of the invention can be formulated as compositions comprising an antiviral amount of one or more copolymers in admixture with a pharmaceutically-acceptable adjuvant. Such compositions generally contain about 0.0001 to about 10, to about 95 or more percent by weight of copolymer, it being essential only that the composition contain an antiviral amount of one or more copolymers. Concentrate compositions adapted for further dilution with pharmaceutically-acceptable adjuvants before use generally contain from about 10, to about 50, to about 95 percent by weight of copolymer. The copolymers are stable for prolonged periods, and both solid and liquid compositions retain their desirable antiviral properties during extended storage under a variety of storage conditions. The term "pharmaceutically-acceptable adjuvant" is herein employed to refer to those adjuvants conventionally employed in the administration of compounds to animals, and which are substantially non-toxic at dosages of copolymer composition which provide good antiviral effects so that the beneficial properties of the method and composition of the invention are not vitiated by effects attributable to the adjuvants. The procedure for selection of particular pharmaceutically-acceptable adjuvants to be employed in particular situations or for particular routes of administration are well known to those skilled in the formulation of compositions to be administered to animals.

Preferred compositions are parenteral preparations comprising an antiviral amount of one or more copolymers and sufficient of a pharmaceutically-acceptable basic substance to provide a substantially neutral pH in the composition, that is, a pH sufficiently near that of the animal fluid system into which the composition is introduced so that the composition is substantially non-irritating when administered parenterally. The basic substance can comprise pharmaceutically-acceptable buffers such as citrate, acetate or phosphate buffers, or can comprise alkali metal hydroxide such as sodium hydroxide or potassium hydroxide or the like. In such compositions, a portion of the copolymer can be present in the form of a pharmaceutically-acceptable salt with a cation or cations supplied by the basic substance. Such preferred compositions are desirably substantially free of impurities such as those arising from the preparation of the copolymer, generally containing less than about five parts and preferably less than about one part by weight of chain transfer agent, unreacted monomers, polymerization catalyst or the like per 100 parts by weight of copolymer.

The compositions can also comprise aqueous vehicles including water-miscible vehicles and the parenteral preparations comprising a copolymer and a basic substance will preferably include an aqueous vehicle. Representative aqueous vehicles include water, physiological saline, Ringer's injection, dextrose injection, lactated Ringer's injection, dextrose and sodium chloride injection, ethanol, liquid polyethylene glycols and polypropylene glycols, and the like and compatible mixture thereof. Such compositions generally comprise a solution of an antiviral amount of one or more copolymers in an aqueous vehicle such as water, together with sufficient pharmaceutically-acceptable basic substance to provide a substantially neutral pH in the ultimate solution. In the liquid compositions, the copolymer is generally present in amounts from about 1 microgram or less to about 0.1 gram or more of copolymer per milliliter of composition, and the basic substance is generally present in an amount sufficient to provide a pH of from about 6 or less to about 7.5 or higher in the ultimate mixture.

When desired, the compositions can be formulated with pharmaceutically-acceptable adjuvants adapted to release an antiviral amount of copolymer composition into the animal body fluid systems over a prolonged period of time and at a predetermined rate. Such adjuvants are preferably physiologically inert materials which are substantially insoluble but which are sufficiently permeable to permit leaching of the copolymer composition from the adjuvant into the animal body fluid system over prolonged periods, such as silicone sustained release adjuvants, or which are slowly dissolved or dispersed under the conditions of use so that the rate of copolymer release is controlled by the rate at which the adjuvant dissolves or disperses. Such compositions can be administered parenterally by conventional procedures such as subcutaneous or intra-muscular implantation to provide for administration of an antiviral amount of copolymer over a prolonged period. In using such compositions, the rate at which the copolymer is released from the adjuvant into the animal body fluid system should be taken into consideration in determining the antiviral amount of copolymer to be employed.

The compositions can also comprise pharmaceutically-acceptable adjuvants such as suspending agents and surface active dispersing agents to facilitate the dispersion and distribution of the copolymer in the animal body fluid systems and in solvents employed in the formulation of injectable liquid compositions. Particular adjuvants include suspending agents, surface active dispersing agents, emulsifying agents, oils or non-aqueous vehicles can be formulated with an antiviral amount of copolymer to obtain compositions having particular physical properties or other characteristics by routine formulation and compounding procedures. The copolymers can also be formulated as oil-in-water or water-in-oil emulsions wherein the oil phase comprises a pharmaceutically-acceptable oil or a pharmaceutically-acceptable non-aqueous vehicle and in which the water phase comprises a solution or suspension of the copolymer in an aqueous vehicle.

The compositions can also comprise preservatives such as methyl p-hydroxybenzoate, hexylresorcinol, phenyl mercuric benzoate, chlorobutanol, benzethonium chloride or like antimicrobial agents or antioxidants such as alkali metal sulfites, sodium formaldehyde sulfoxylate or the like or chelating agents such as the sodium salt of ethylenediaminetetraacetic acid. They can also comprise finely divided inert solids, preferably water-soluble inert solids such as lactose, glucose, maltose, dextrose, gelation and the like.

In a further embodiment of the invention, the copolymer compositions can contain effective amounts of other active agents either as adjuvants or as supplementary materials. Representative active agents employed in copolymer compositions can include chemotherapeutic agents such as amphotericin B, erythromycin, kanamycin, penicillin, sodium sulfadiazine, chlorotetracycline hydrochloride, oxytetracycline hydrochloride, procaine penicillin, antimony potassium tartrate, chloroquine sulfate and the like, as well as biological agents including immune serum preparations such as antirabies serum, antibrucella serum, antipneumococcic serum, antitularemic serum and the like; immune serums; adjuvants such as Freund's adjuvant or alginic acid, gum tragacanth, peanut oil, and the like; antitoxins such as Staphylococcus antitoxins, tetanus antitoxins, botulism antitoxins and the like; bacterial endotoxins; complex anionic polysaccharides such as statolon; phytohemagglutinin; nucleic acids and derivatives thereof; and viruses which can be either live or inactivated, attenuated or unattenuated viruses.

In general, excellent results are obtained with parenteral compositions comprising an aqueous solution of an antiviral amount of a copolymer and sufficient pharmaceutically-acceptable basic substance to provide a substantially neutral pH therein.

DESCRIPTION OF THE PREFERRED EMBODIMENTS

The following examples are illustrative of the invention but are not intended to limit the same.

EXAMPLE 1

The following representative procedure is employed to prepare a copolymer of acrylic and maleic acid with a monomer ratio $(A/M)$ of 20:80:

12.5 grams of acrylic acid, 50 grams of maleic acid and 187.5 grams of water are mixed together in a glass citrate bottle. To the resulting mixture is added 0.0625 gram of potassium persulfate catalyst and 0.188 gram of thioglycolic acid. The resulting polymerization mixture is mixed well and sparged with nitrogen for about one minute. The citrate bottle is capped and the mixture is heated at a temperature of 60° C. for 24 hours. The mixture is then dialyzed against deionized water for 24 hours. After dialysis, the composition contains 7.73 percent solids. It has a normality of 1.60 calculated as acid and based on titration to pH 7.0 with aqueous sodium hydroxide, and a specific viscosity of 0.67.

EXAMPLE 2

The following representative procedure is employed to prepare a copolymer of acrylic acid and itaconic acid with a monomer ratio $(A/I)$ of 50:50:

31.25 grams of acrylic acid, 31.25 grams of itaconic acid and 187.5 grams of water are mixed together in a glass citrate bottle. To the resulting monomer mixture is added 0.0625 gram of potassium persulfate catalyst and 0.0063 gram of thioglycolic acid. The resulting polymerization mixture is mixed well and sparged with nitrogen for about one minute. The citrate bottle is capped and the mixture is heated at a temperature of 40° C. for 24 hours. The mixture is then dialyzed against deionized water for 24 hours. After dialysis, the composition contains 8.59 percent solids. It has a normality of 0.9 calculated as acid, and based on titration to pH 7.0 with aqueous sodium hydroxide, and a specific viscosity of 1.4.

In substantially the same procedure, equal amounts of acrylic acid and itaconic acid are copolymerized to prepare a series of copolymers with a monomer ratio $(A/I)$ of 50:50. The amounts of catalyst, sodium bisulfite activator and thioglycolic acid employed, the reaction medium, the time and temperature employed for polymerization and the specific viscosity is set out below in Table I for each copolymer.

TABLE I

| 50:50 monomer ratio | Potassium persulfate catalyst, percent of monomer weight | Sodium bisulfite, percent of monomer weight | Thioglycolic acid, percent of monomer weight | Time, hours | Polymerization temperature, °C | Polymerization medium | Specific viscosity |
|---|---|---|---|---|---|---|---|
| Acrylic:itaconic | 0.1 | 0 | 0.01 | 2 | 40 | Water | 0.5 |
| | 0.1 | 0 | 0.01 | 20 | 40 | do | 2.0 |
| | 0.05 | 0.025 | 0.01 | 96 | 25 | Aqueous sodium sulfate (3.5% by weight of water) | 2.95 |
| | 0.05 | 0.025 | 0 | 96 | 25 | do | 3.54 |
| | 0.05 | 0.025 | 0.01 | 96 | 25 | Aqueous sodium sulfate (7% by weight of water) | 4.13 |
| | 0.05 | 0.025 | 0 | 96 | 25 | do | 4.54 |
| | 0.01 | 0.005 | 0.01 | 89 | 25 | do | 5.3 |
| | 0.05 | 0.025 | 0.01 | 89 | 25 | do | 5.6 |
| | 0.05 | 0.025 | 0.005 | 240 | 25 | do | 7.77 |

EXAMPLE 3

An aqueous composition comprising an antiviral amount of the aqueous dialyzed acrylic acid-maleic acid copolymer with a monomer ratio ($A/M$) of 20:80 of Example 1 is prepared by neutralizing the copolymer with sufficient aqueous 5 molar sodium hydroxide solution to provide a pH of 7 in the ultimate mixture. The neutralized copolymer composition is further diluted with sterile distilled water to provide a series of compositions containing various antiviral concentrations of the copolymer from about 0.5 to about 10 milligrams of copolymer as the neutral sodium salt per milliliter of aqueous composition. The compositions are adapted to be administered to animals in antiviral amounts.

EXAMPLE 4

The aqueous compositions of the preceding example containing from about 0.5 to about 3 milligrams of a copolymer of acrylic acid and maleic acid with a monomer ratio ($A/M$) of 20:80 and a specific viscosity of 0.67 per milliliter as the neutral sodium salt are separately administered to separate groups of ten young mice of the same origin and past history soon after the mice are weaned. The mice employed have an average weight of 12.5 grams. Mice of both sexes are included in each test group. The compositions are administered by the intraperitoneal injection of 0.2 milliliter of composition to each mouse to provide a series of separate groups of mice treated with various amounts of copolymer. Twenty-four hours after the administration of the copolymer, the mice are challenged by the intraperitoneal injection of mengovirus (large plaque variant) at a rate sufficient to challenge each mouse with from 10 to 25 times the LD50 of the mengovirus. (The term "LD50" of a virus refers to a virus challenge sufficient to cause death in 50 percent of normal untreated mice.) A similar group of check mice which has not been administered any copolymer is similarly challenged with mengovirus. All the mice are then held and observed. The check mice are observed to exhibit symptoms of mengovirus infection, and all of the check mice are observed to die from mengovirus infection within about six days after the challenge. All the mice in the test groups treated by the injection of an antiviral amount of from about 15 to about 50 milligrams of the copolymer per kilogram of animal body weight exhibit no symptoms of mengovirus infection. Throughout the test period, the mice pretreated with the copolymer appear normal in appetite, activity and physical appearance and appear to be similar to mice which have received neither a copolymer compound nor a virus challenge, indicating the production of inteferon or interferon-like material in the mice administered the copolymer. Similar results are observed when the copolymer is administered by intramuscular injection or by subcutaneous injection.

EXAMPLE 5

A series of serum pools are obtained and assayed by the following procedure. Aqueous compositions containing a copolymer of acrylic and maleic acids with a monomer ratio ($A/M$) of 20:80 and a specific viscosity of 0.67 are prepared as described in the preceding Examples 3 and 4. The compositions are separately administered to separate groups of adult 25 gram mice and to separate groups of young 12.5 gram mice. Mice of both sexes are included in each test group to provide sixty mice per group. The compositions are administered by the intraperitoneal injection of 0.2 milliliter of composition to each mouse to provide a series of separate groups of adult mice and a series of groups of young mice treated with an antiviral amount of 12, 25 or 50 milligrams of copolymer per kilogram of animal body weight. Twenty-four hours after the virus challenge, the mice in each group are exsanguinated and pooled serum from each group is collected. The serum pools from each group are then assayed to determine interferon titer by plaque reduction assay using mouse L-cells with about 100 plaque-forming units of vesicular stomatitis virus as a challenge. The assay procedure employed is similar to that described by Finter, Interferons, North-Holland Publishing Co. (1966) at pp. 89–91. Substantial levels of interferon are detected in serum pools obtained from groups of adult 25 gram mice administered the copolymer at dosage rates of 12, 25 and 50 milligrams per kilogram. Substantial concentrations of interferon, generally in excess of 5 units per milliliter of serum, are detected in serum pools from groups of young 12.5 gram mice administered the copolymer at dosages of 50 to 100 milligrams per kilogram.

In similar operations, substantial levels of interferon are detected in serum pools obtained from adult mice administered 20 milligrams of an acrylic acid/itaconic acid copolymer with a monomer ratio ($A/I$) of 50:50 and a specific viscosity of 1.4 per kilogram. The copolymer is administered by intraperitoneal injection in the form of aqueous compositions containing 0.5 milligram of copolymer neutralized to pH 7 with sodium hydroxide dissolved in sufficient sterile distilled water to provide a total volume of 0.2 milliliter.

In check operations, serum pools are obtained from groups of similar adult mice and similar young mice which have not been administered a copolymer, and the serum pools are similarly assayed for interferon. No significant interferon is found in the check serum pools.

EXAMPLE 6

In procedures similar to those described above, various representative copolymers of the invention are prepared. The monomers employed, the ratio of monomers, the amount of catalyst and chain transfer agents employed in percent by weight of total weight of monomer in the polymerization mixture and the polymerization temperature are set out in the following Table II. Water is employed as a polymerization medium. After polymerization, each of the reaction mixtures is dialyzed against distilled water for from 2 to 24 hours, using a cellulose membrane. The solids content, specific viscosity and acid normality based on titration to pH 7.0 with aqueous sodium hydroxide are determined. These values are also set out in Table II for each copolymer.

TABLE II

| Monomer ratio | Potassium persulfate catalyst, percent of monomer weight | Chain Transfer agent, percent of monomer weight | Time, hours | Polymerization temperature, °C. | Specific solids | Percent solids | Acid normality |
|---|---|---|---|---|---|---|---|
| Acrylic:citraconic: | | Thioglycolic acid | | | | | |
| 50:50 | 0.10 | 0.03 | 24 | 40 | 1.4 | 4.12 | 0.54 |
| 50:50 | 0.10 | 0.10 | 24 | 40 | 1.0 | 3.50 | 0.45 |
| 20:80 | 0.10 | 0.01 | 24 | 60 | 1.8 | 4.34 | 0.60 |
| Acrylic:itaconic: | | | | | | | |
| 60:40 | 0.1 | 1.00 | 24 | 40 | 0.12 | 3.29 | 0.38 |
| 60:40 | 0.1 | .30 | 24 | 40 | 0.28 | 3.28 | 0.38 |
| 60:40 | 0.1 | .10 | 24 | 40 | 0.54 | 3.97 | 0.45 |
| 60:40 | 0.1 | .03 | 24 | 40 | 3.49 | 3.77 | 0.41 |
| 60:40 | 0.1 | .01 | 24 | 40 | 3.81 | 3.20 | 0.35 |
| 50:50 | 0.1 | 0.01 | 2.5 | 40 | 0.53 | 3.18 | 0.34 |
| 50:50 | 0.1 | 0.01 | 5 | 40 | 1.7 | 3.36 | 0.37 |
| 50:50 | 0.1 | 0.01 | 21 | 40 | 20.4 | 3.66 | 0.41 |
| 50:50 | 0.1 | 0.01 | 29 | 40 | 2.07 | 3.24 | 0.35 |
| 50:50 | 0.1 | 0.01 | 94 | 40 | 2.42 | 3.36 | 0.38 |
| 10:90 | 0.1 | 0.01 | 24 | 40 | 1.97 | 2.84 | .26 |
| 35:65 | 0.02 | 0.00 | 120 | 40 | 1.41 | 4.05 | 0.42 |
| | | L-cystine | | | | | |
| 50:50 | 0.1 | 0.01 | 24 | 40 | 1.34 | 3.21 | 0.33 |
| 50:50 | 0.1 | .3 | 24 | 40 | 1.39 | 3.18 | .34 |
| 50:50 | 0.1 | 3.0 | 24 | 40 | 1.46 | 3.38 | .38 |
| Acrylic:itaconic:maleic: | | Thioglycolic acid | | | | | |
| 40:30:30 | 0.1 | 0.1 | 24 | 40 | 0.5 | 2.67 | .30 |
| 25:25:50 | 0.1 | 1.0 | 24 | 40 | 0.3 | 1.93 | .19 |
| Acrylic:itaconic:citraconic: | | | | | | | |
| 33:33:33 | 0.1 | 0.03 | 24 | 40 | 2.31 | 3.34 | .38 |
| Acrylic:maleic: | | | | | | | |
| 20:80 | 0.1 | 0.3 | 24 | 40 | 1.43 | 5.12 | 0.66 |
| 20:80 | 0.1 | 0.3 | 24 | 60 | 2.59 | 5.50 | 0.73 |
| 10:90 | 0.03 | 0.00 | 24 | 40 | 3.94 | 3.00 | 0.38 |

EXAMPLE 7

A series of aqueous compositions is prepared by neutralizing aqueous dialyzed solutions of various copolymers of acrylic acid and itaconic acid prepared as described in Examples 1, 2 and 6, with sodium hydroxide solution to provide a pH of 7 in the ultimate mixture. The neutralized compositions are further diluted with sterile distilled water to provide a series of aqueous compositions containing from about 0.1 or less to 3 or more milligrams of copolymer per milliliter of composition, the copolymer being present as the sodium salt. Each composition is separately administered to a separate group of ten mice of the same origin and past history. Mice of both sexes are included in each test group. The compositions are administered by intraperitoneal injection at various dosage rates. Twenty-four hours after the administration of the copolymer, the mice are challenged by the intraperitoneal injection of mengovirus (large plaque variant) at a rate sufficient to challenge each mouse with from 10 to 200 times the LD50 of the mengovirus. A similar group of check mice which has not been administered any copolymer is similarly challenged with mengovirus. A separate check group is employed for each copolymer tested, and the mengovirus challenge is the same for the check group as for the test group. All the mice are then held and observed for ten days. During the test period, the check mice exhibit symptoms of mengovirus infection, and all of the check mice are observed to die from mengovirus infection within about six days after the challenge. The mice are observed to determine the number of mice surviving the mengovirus challenge at a time when all the check mice are dead. Complete protection from mengovirus attack or 100 percent survival is observed when representative copolymers are administered at the dosage rates set out in Table III.

TABLE III

| Monomer ratio | Specific viscosity | 100% effective dose in mg./kg. |
|---|---|---|
| Acrylic: itaconic: | | |
| 40:60 | 1.03 | 25 |
| 40:60 | 1.06 | 2 |
| 40:60 | 1.14 | 6 |
| 50:50 | 0.53 | 5 |
| 50:50 | 1.70 | 6 |
| 50:50 | 1.89 | 3.5 |
| 50:50 | 2.04 | 2 |
| 50:50 | 2.07 | 2 |
| 50:50 | 2.42 | 0.7 |
| 50:50 | 3.54 | 7 |
| 50:50 | 4.5 | 1 |
| 50:50 | 5.6 | 1.7 |
| 50:50 | 7.8 | 2 |
| 60:40 | 0.12 | 7.5 |
| 60:40 | 0.28 | 3 |
| 60:40 | 0.54 | 2 |
| 60:40 | 3.49 | 3 |
| 60:40 | 3.81 | 3 |

EXAMPLE 8

A series of aqueous compositions is prepared by neutralizing dialyzed aqueous copolymer compositions obtained by polymerization of equal parts of itaconic acid and acrylic acid substantially as described above in Examples 2 and 6 to provide a pH of 7 in the ultimate mixture. The neutralized composition is further diluted with sterile distilled water to provide a series of injectable compositions. Each composition is separately administered to a separate group of mice of the same origin and past history and the mice are challenged with mengovirus, held and observed by the procedures described above in Example 6 with the sole variation being that the virus challenge is five times the LD50 of the mengovirus. During the test period, the check mice exhibit symptoms of mengovirus infection, and all of the check mice are observed to die from mengovirus infection within about six days after the challenge. The mice are observed to determine the number of mice surviving the mengovirus challenge at a time when all the check mice are dead. The dosage of copolymer effective to protect 50 percent of the treated mice against the mengovirus challenge (P.D. 50) is calculated on the basis of three replications at each dosage rate employing a total of 45 mice for each dosage rate. The dosage of copolymer which is lethal to 50 percent of the mice administered the same by intraperitoneal injection (LD50) is calculated on the basis of two replications employing a total of 30 mice at each dose. In such operations, copolymers of acrylic and itaconic acids with monomer ratios ($A/I$) of 50:50 and specific viscosities of 1.3, 1.4, 1.5 and 1.6 are each found to have a P.D. 50 of less than one milligram per kilogram and to have an L.D. 50 in excess of 200 milligram per kilogram.

EXAMPLE 9

A series of injectable aqueous compositions is prepared from various copolymers as set out above in Examples 7 and 8. The copolymers are prepared by substantially the same procedure described in Examples 1, 2 and 6. Each composition is separately administered to a separate group of eight to ten mice of the same origin and past history and the mice are challenged with mengovirus in a procedure exactly similar to that described in Examples 7 and 8 with the sole variation being that the mice are challenged by the intraperitoneal injection of mengovirus (large plaque variant) at a rate sufficient to challenge each mouse with from 10 to 200 times the LD50 of the mengovirus. The treated mice are observed to determine the number of mice surviving the mengovirus challenge at a time when all the check mice are dead. Complete protection or 100 percent survival of the mice is observed with the mice administered a particular copolymer at the dosage set out as "100 percent effective dose" in the following table.

TABLE IV

| Monomer ratio | Specific viscosity | 100% effective dose in mg./kg. |
|---|---|---|
| Acrylic:citraconic: | | |
| 50:50 | 1.4 | 5 |
| 50:50 | 1.0 | 6 |
| 20:80 | 1.3 | 15 |
| Acrylic:maleic:10:90 | 1.8 | 6 |
| Acrylic:itaconic:citraconic:33:33:33 | 1.1 | 15 |
| Acrylic:itaconic:maleic: | | |
| 40:30:30 | 1.6 | 6 |
| 40:30:30 | .5 | 3 |
| 20:60:20 | 1.2 | 4 |
| 20:60:20 | 1.5 | 2 |
| 25:25:50 | 0.3 | 10 |
| Acrylic:acrylamide:itaconic: | | |
| 20:20:60 | 1.4 | 8 |
| 20:20:60 | 1.1 | 9 |
| 20:20:60 | 0.7 | 20 |

EXAMPLE 10

A group of 60 mice of both sexes and of similar origin and past history are administered a copolymer of acrylic and itaconic acids, with a monomer ratio ($A/I$) of 50:50 and a specific viscosity of 1.22, at a dosage rate of 20 milligrams of copolymer per kilogram of animal body weight by intraperitoneal injection. 24 hours after the administration of the copolymer compound, all the mice are sacrificed and exsanguinated. The blood is pooled and processed to collect the serum. The serum pool is employed in various tests as follows:

In assay procedures carried out by plaque counts under fluid overlay employing mouse L-cells and Eagle's medium with 10 percent calf serum, portions of the serum pool are observed to bring about substantial reductions in plaque-forming units of mengovirus and vesicular stomatitis virus as compared with serum from untreated check mice.

A portion of the serum pool is dialyzed against a carbonate/bicarbonate buffer having a pH of 10 for twelve hours and is then dialyzed against Eagle's medium. Another portion of the serum pool is dialyzed overnight against a hydrochloric acid/potassium chloride buffer having a pH of 2. The two dialyzed portions of serum are both found to retain activity against vesicular stomatitis virus as determined by plaque reduction assay.

Other portions of the serum pool are centrifuged and then assayed for antiviral activity against mengovirus by plaque reduction assay. In such opertaions, the viral inhibitory activity of the serum pool is found to remain after centrifugation at 40,000 revolutions per minute for ninety minutes.

Mouse L-cell tissue cultures are treated with portions of the serum pool and then incubated for several hours. The cells are then washed with phosphate buffered saline solution and incubated with mengovirus. The cells thus treated are found to have substantial antiviral activity as determined by plaque counts.

Other portions of the serum pool are incubated with various proteolytic enzymes and then assayed for antiviral activity by plaque reduction assay against mengovirus. The antiviral activity of the serum is lost on incubation with trypsin or pepsin.

Another portion of the serum pool is diluted 10-fold with Eagle's medium and incubated in a water bath at 60° C. Various aliquots are removed after varying time periods and assayed against mengovirus on mouse L-cells by plaque reduction assay. The half-life of the virus interfering activity is observed to be about 50 minutes.

Another portion of the mouse serum pool is analyzed by Sephadex G-100 column chromatography. Fractions corresponding to various molecular weight ranges are collected and assayed against mengovirus by plaque reduction assay. Antiviral activity is demonstrated by Sephadex chromatography factions having a molecular weight between 62,000 and 70,000.

EXAMPLE 11

A flock of one day old chicks is administered a copolymer of acrylic and itaconic acid, with a monomer ratio ($A/I$) of 20:80 and a specific viscosity of 2.1. The copolymer is administered to the chicks by intraperitoneal injection at a dosage rate of 350 milligrams per kilogram. 24 hours after the administration of the copolymer, the chicks are challenged with Marek's disease virus at a dosage sufficient to provide about ten times the LD50 of the virus. (The LD50 for the challenge virus is that virus challenge which produces death in 50 percent of the challenged chicks.) A similar flock of chicks of the same origin and past history is left untreated to serve as a check. The check group of chicks is similarly challenged with Marek's disease virus. All the chicks are held and observed for nine weeks. More than 80 percent of the chicks in the check flock are observed to exhibit symptoms of Marek's disease and all of the check birds exhibiting such symptoms are observed to die within the test period. Less than 20 percent of the birds administered the copolymer show any symptoms of Marek's disease. More than 80 percent of the chicks administered the copolymer appear normal and healthy in physical appearance, growth, appetite and activity throughout the test period, and no symptoms of Marek's disease are observed with these treated birds, indicating that excellent commercial control of the virus attack is obtained with the use of the copolymer.

In other operations with fowl, thirty four-week-old broiler chicks are administered a copolymer of acrylic acid and itaconic acid with a monomer ratio of 50:50 and a specific viscosity of 1.44 by intraperitoneal injection at a dosage rate of 500 milligrams of copolymer per kilogram of bird weight. The chicks are held for three days, after which they are inoculated with oocysts of the protozoan coccidial organisms *Eimeria necatrix* and *E acervulina*. A similar group of similar chicks is similarly inoculated with protozoan parasites to serve as a check, but the check group is not administered a copolymer. The birds are held for several days, during which time they are examined for weight gain, and symptoms of infection including blood in fecal matter and survival. The observations indicate that excellent inhibition of protozoan attack is obtained with the birds administered the copolymer as compared to the similarly infected but untreated check birds.

EXAMPLE 12

A group of twenty cats is separated into four groups A, B, C and D of five cats each, cats of both sexes being included in each group. None of the cats have previously been exposed to feline rhinotracheitis virus and their susceptibility to feline rhinotracheitis infection is confirmed by assay of blood samples for antibody titer. All of the cats in groups A, B and C are administered an antiviral amount of a copolymer by subcutaneous injection of a neutralized aqueous solution of a copolymer of acrylic acid and maleic acid with a monomer ratio $(A/M)$ of 20:80 and a specific viscosity of 0.67. The cats in groups A, B and C are each administered the copolymer composition at dosage rates 50, 25 and 12.5 milligrams of copolymer per kilogram of animal body weight, respectively. The cats in group D are not treated with any copolymer composition. The animals are then held for two weeks, after which time all the cats are exposed to feline rhinotracheitis virus. Virus exposure is carried out by placing the virus intraocularly and by placing cats infected with feline rhinotracheitis in close proximity to the test cats. The infected cats and the test cats in groups A, B, C and D are caged together for a two week test period. All the untreated cats in group D are observed to exhibit symptoms of feline rhinotracheitis during the test period. The infected control animals are not removed but remain in contact with the test animals of groups A, B and C until the end of the test period. Observations of the cats in groups A, B and C indicate that excellent protection from feline rhinotracheitis virus is obtained in the fifteen cats administered the copolymer composition, with twelve cats showing no symptoms of feline rhinotracheitis infection and the three remaining cats showing only slight symptoms of virus attack. Assays for feline rhinotracheitis antibodies in blood samples taken from the cats in groups A, B and C indicate that all the cats administered the copolymer composition have developed antibodies and that immunity to feline rhinotracheitis infection is established.

EXAMPLE 13

Two groups of three-week-old puppies A and B are prepared, puppies of both sexes being included in each group. The puppies are administered an antiviral amount of a copolymer by subcutaneous injection. The puppies in the first group A are administered a copolymer of acrylic acid and itaconic acid, with a monomer ratio $(A/I)$ of 50:50 and a specific viscosity of 1.4, at an initial dosage rate of 10 milligrams of copolymer per kilogram of animal body weight and at repeated dosages of 1 milligram of copolymer per kilogram of animal body weight every three weeks following the initial dosage. The second group of puppies B is administered a copolymer of acrylic and maleic acids, with a monomer ratio $(A/M)$ of 20:80 and a specific viscosity of about 0.67, at an initial dosage of 10 milligrams of copolymer per kilogram and at repeated dosages of 1 milligram of copolymer per kilogram of animal body weight at three week intervals following the initial dosage. A third group of puppies of similar age and background to the puppies in groups A and B is not administered any copolymer to provide a check group. The three groups of puppies are held together for a period of twenty weeks during which time they are challenged with canine distemper virus. Puppies which show symptoms of canine distemper are not isolated from the remaining puppies. Blood samples are taken periodically from each puppy and assayed for canine distemper antibody titer. By the end of the twentieth week, all of the untreated puppies in the check group demonstrate production of canine distemper antibodies. During the test period, symptoms of canine distemper are observed in all the untreated check puppies. At no time during the twenty week test period are canine distemper antibodies observed in any of the puppies receiving a copolymer. All of the animals in groups A and B are observed to be healthy and normal in appearance, appetite, weight gain and activity throughout the test period and none of the animals in these groups is observed to exhibit symptoms of canine distemper.

EXAMPLE 14

500 grams of acrylic acid, 500 grams of itaconic acid and 3000 grams of water are mixed together in a glass reaction vessel. To the resulting monomer mixture is added one gram of potassium persulfate catalyst and 0.1 gram of thioglycolic acid. The resulting polymerization mixture is sparged with nitrogen while the mixture is heated with stirring at a temperature of 40° C. for 96 hours. The mixture is then dialyzed against deionized water using regenerated cellulose dialysis tubing for 24 hours. After dialysis, the composition contains 7.7 percent solids. It has a normality of 0.81 calculated as acid, and based on titration to pH 7.0 with aqueous sodium hydroxide, and has a specific viscosity of about 1.4.

A portion of the dialyzed copolymer solution is fractionated with dioxane. In the fractionation, 400 grams of the copolymer solution are mixed with 4850 milliliters of dioxane to precipitate a first copolymer fraction. The first copolymer fraction is separated by filtration and washed with distilled water. The filtered mixture of dioxane and copolymer solution is then mixed with an additional 375 milliliters of dioxane to precipitate a second copolymer fraction which is similarly separated by filtration and washed. The fractionation process is repeated three times to obtain a total of five separate copolymer fractions. The amounts of dioxane added to precipitate each fraction and the specific viscosities of the fractions are set out in the following table.

| Fraction | Dioxane added in milliliters | Specific viscosity |
| --- | --- | --- |
| 1 | 4,850 | 3.8 |
| 2 | 375 (additional) | 2.4 |
| 3 | 275 (additional) | 1.6 |
| 4 | 500 (additional) | 0.9 |
| 5 | 2,500 (additional) | 0.5 |

Each of the washed copolymer fractions is separately dissolved in sterile distilled water and the solutions are neutralized with aqueous sodium hydroxide and diluted with water to prepare a series of aqueous compositions, A portion of the unfractionated copolymer solution is similarly neutralized and diluted. The resulting compositions are then administered to mice and the mice are challenged with mengovirus by procedures similar to those described above in Example 7. In such operations, the copolymer composition and each of the copolymer fractions are observed to provide excellent protection from virus attack.

A separate portion of the copolymer is fractionated on a seventy inch column of Sephadex G-200. Five 100 milliliter fractions, each containing about 5 milligrams of copolymer per milliliter are collected. The fractions are evaluated in mice by substantially the same procedures described above in Example 8. Each fraction is found to have a PD 50 of less than one milligram per kilogram. The therapeutic index (LD 50/PD 50) is calculated for each copolymer fraction and found to be greater than 400 in each case.

EXAMPLE 15

A portion of the copolymer of Example 14 is employed to inhibit the attack of the arbovirus, Sindbis, on mice.

In such operations, the unfractionated copolymer composition is neutralized and diluted with sterile distilled water to prepare an aqueous injectable composition. The copolymer composition is administered to groups of mice by intraperitoneal injection of an antiviral amount of copolymer equivalent to 2 milligrams per kilogram. Separate groups of mice are similarly administered sterile water to serve as checks. 24 hours later, all the mice are challenged by the injection of Sindbis virus into the nape of the neck. At intervals after the virus challenge, blood is collected separately from a test group of mice and from a control group. Serum is removed from the blood samples and assayed for Sindbis virus by plaque formation assay on chick embryo cells. The results observed with the check mice show an increase in virus concentration from about 5 to 10 plaque-forming units per milliliter 2.5 hours after challenge to a maximum concentration of over 200 plaque-forming units between 20 and 30 hours after challenge, followed by a decrease in virus concentration until no virus is detected 80 hours after challenge. The results observed with the test groups treated with the copolymer show a similar pattern of increasing virus concentration to a maximum between 20 and 30 hours after challenge, followed by a decrease; however, the maximum virus concentration observed is 50 plaque-forming units per milliliter, indicating a 75 percent inhibition of the virus.

In other representative operations, the copolymer of Example 14 is employed to inhibit the attack of a poxvirus in mice. In such operations, IHD strain vaccinia virus propagated in chicken eggs is administered to separate groups of mice which have been administered an antiviral amount of the copolymer by intraperitoneal injection one day before the virus challenge. The virus is administered by injection into the tail vein of the mice. A check group of untreated mice is similarly challenged with vaccinia virus. Observations carried out six to eight days after administration of the virus indicate that the mice administered 10 or 20 milligrams of the copolymer per kilogram of animal body weight are resistant to the virus, such mice having an average of one to two virus-induced lesions as compared to an average of six to seven lesions per mouse observed in the untreated check mice.

EXAMPLE 16

Compositions useful for administration to animals are formulated as described below from copolymer compositions prepared by procedures similar to those described above.

(A) An aqueous solution containing 6.7 percent by weight of a copolymer of acrylic and itaconic acids, with a monomer ratio $(A/I)$ of 43.7:56.3 and a specific viscosity of 0.97, is purified by dialysis and neutralized with an aqueous solution containing 2 normal sodium hydroxide, 2 normal potassium hydroxide and 0.001 normal calcium hydroxide to a final pH of 6.3. The solution is diluted by the addition of aqueous 0.5 percent hydroxypropylmethyl cellulose to provide a composition containing 0.035 percent by weight of the copolymer. 0.05 percent by weight of methyl p-hydroxybenzoate is added as a preservative and the composition is filtered, filled into 5 cubic centimeter vials and sterilized.

(B) An aqueous solution containing 5.4 percent by weight of a copolymer of acrylic acid and maleic acid, with a monomer ratio $(A/M)$ of 45:55 and a specific viscosity of 2.3, is mixed together with an aqueous solution containing 3.1 percent by weight of a copolymer of acrylic, itaconic, maleic and citraconic acids, with a monomer ratio $(A/I/M/C)$ or 25:30:30:15 and a specific viscosity of 2.4. The mixture is purified by dialysis and neutralized to a pH of 6.8 with aqueous 3.5 normal ammonium carbonate solution. The mixture is diluted with 15 percent aqueous polyethylene glycol 200 (polyethylene glycols having an average molecular weight of 200) solution to provide a copolymer concentration of 0.55 percent by weight. The mixture is filled into 3 cubic centimeter vials and sterilized.

(C) An aqueous solution containing 6 percent by weight of a copolymer of acrylic acid and itaconic acid with a monomer ratio $(A/I)$ of 75:25 and a specific viscosity of 7, is purified by dialysis. The copolymer composition is precipitated from the solution by the addition of a larger excess of dioxane and separated by filtration. The solid copolymer composition is purified by washing with water, dried and the dried mixture is mixed with sodium carbonate. The sodium carbonate is employed in an amount sufficient to provide a pH of 7.1 when the dried mixture is dissolved in water to prepare an aqueous solution having a solids content of 0.15 percent by weight. 95 parts by weight of the solid mixture are intimately mixed with 5 parts by weight of hydroxyethyl cellulose and 5 parts by weight of a surface active dispersing agent comprising a mixture of sucrose mono-, di- and triglycerides with fatty acids of from 12 to 18 carbon atoms, inclusive. The mixture is filled into 5 cubic centimeter glass vials in the amount of 0.1 gram per vial and the vials are sealed and sterilized. The composition is adapted to be diluted with aqueous vehicles such as physiological saline solution and administered to animals by injection.

(D) An aqueous solution containing 3 percent by weight of a copolymer of acrylic acid and maleic acid, with a monomer ratio $(A/M)$ of 80:20 and a specific viscosity of 3.1, is purified by dialysis and neutralized to a final pH of 7.0 by the addition of aqueous 4 normal potassium hydroxide solution. The mixture is diluted with aqueous 0.1 percent sodium alginate to provide a composition containing 0.5 percent by weight of the copolymer. 0.03 percent by weight of methyl p-hydroxybenzoate and 0.01 percent by weight of sodium bisulfite are added to the mixture and the mixture is filtered, filled into 4 cubic centimeter vials and the vials are sealed and sterilized.

What is claimed is:

1. A method which comprises parenterally administering to an animal an antiviral amount of a copolymer of from about 10 to about 80, inclusive, parts by weight of an acrylic monomer and from about 90 to about 20, inclusive, parts by weight of one or more dicarboxylic monomer selected from the group consisting of citraconic acid, itaconic acid, and maleic acid, the copolymer having a specific viscosity of from about 0.1 to about 8, inclusive.

2. The method of claim 1 wherein the copolymer is of acrylic acid as the acrylic monomer.

3. The method of claim 1 wherein the copolymer is of itaconic acid as the dicarboxylic monomer.

4. The method of claim 1 wherein the copolymer is of maleic acid as the dicarboxylic monomer.

5. The method of claim 1 wherein the specific viscosity of the copolymer is from about 0.5 to about 2.5, inclusive.

6. The method of claim 1 wherein the copolymer is of acrylic acid and maleic acid, the monomer ratio of acrylic acid to maleic acid is from about 20:80 to about 60:40, inclusive, and wherein the specific viscosity of the copolymer is of from about 0.1 to about 4, inclusive.

7. The method of claim 6 wherein the specific viscosity of the copolymer is from about 0.5 to about 2.5, inclusive.

8. The method of claim 6 wherein the copolymer is a copolymer with a monomer ratio of acrylic acid to maleic acid of from about 40:60 to 60:40, inclusive.

9. The method of claim 1 wherein the copolymer is of acrylic acid and itaconic acid and the monomer ratio of acrylic acid to itaconic acid is from about 10:90 to about 60:40, inclusive.

10. The method of claim 9 wherein the specific viscosity of the copolymer is from about 0.5 to about 2.5, inclusive.

11. The method of claim 9 wherein the copolymer is one with a monomer ratio of acrylic acid to itaconic acid of from about 40:60 to about 60:40.

12. A composition comprising from about 0.0001 to about 95 percent by weight of a copolymer of from about 10 to about 80, inclusive, parts by weight of an acrylic monomer with from about 90 to about 20, inclusive, parts by weight of one or more dicarboxylic monomer selected from citraconic acid, itaconic acid and maleic acid, the copolymer having a specific viscosity of from about 0.1 to about 4; in admixture with a pharmaceutically-acceptable adjuvant.

13. The composition of claim 12 further comprising sufficient of a pharmaceutically-acceptable basic substance to provide a substantially neutral pH therein.

14. The composition of claim 12 wherein the composition is a liquid parenteral preparation containing from about one microgram to about 0.1 gram of the copolymer per milliliter of composition, and further comprising sufficient pharmaceutically-acceptable basic substance to provide a pH of from about 6 to about 7.5 therein.

15. The composition of claim 14 wherein the copolymer is of acrylic acid and itaconic acid and the monomer ratio of acrylic acid to itaconic acid is from about 40:60 to about 60:40.

References Cited

Finter, Interferons, published by North-Holland Publishing Co., Amsterdam, 1966, p. 256.

The Lancet, March 6, 1965, pp. 505 and 506.

RICHARD L. HUFF, Primary Examiner

U.S. Cl. X.R.

424—85